UNITED STATES PATENT OFFICE.

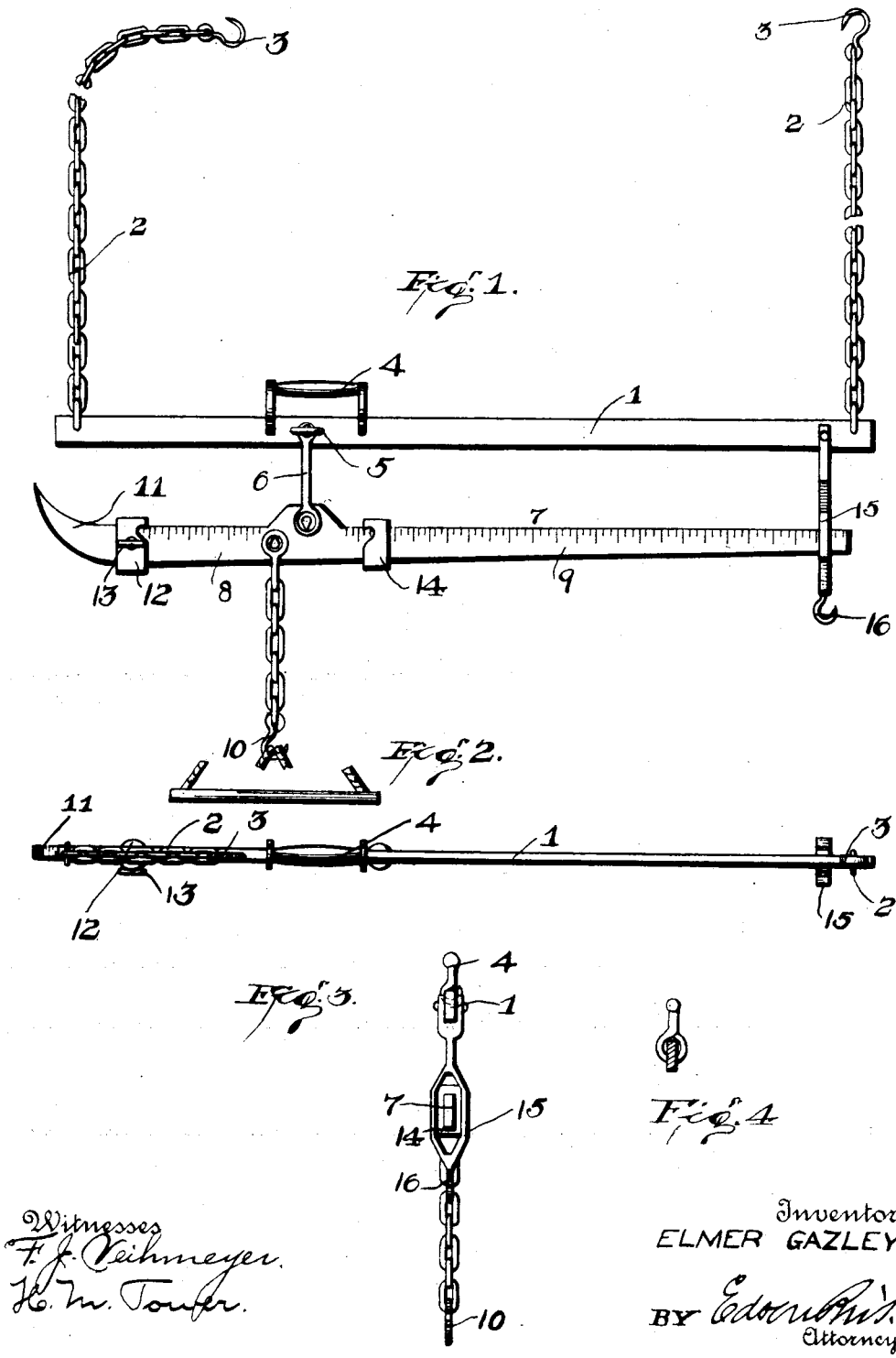

ELMER GAZLEY, OF CANYONVILLE, OREGON.

SCALE.

No. 865,883.  Specification of Letters Patent.  Patented Sept. 10, 1907.

Application filed February 7, 1905, Serial No. 244,614. Renewed February 16, 1907. Serial No. 357,757.

*To all whom it may concern:*

Be it known that I, ELMER GAZLEY, a citizen of the United States, residing at Canyonville, in the county of Douglas and State of Oregon, have invented certain new and useful Improvements in Scales; and I do hereby declare the following to be a full, clear, and exact description of the invention, such as will enable others skilled in the art to which it appertains to make and use the same.
My invention relates to improvements in weighing devices or scales.

It has for its object to provide a device of this nature which is simple of construction, cheap of manufacture, and can be conveniently carried from place to place, and is adapted to conform to various conditions and uses.

The invention consists in the details of construction and combinations of parts hereinafter described and more particularly pointed out in the claims concluding this specification.

In the accompanying drawings illustrating the preferred embodiment of my invention Figure 1 is a side elevation of a scale made in accordance with my invention with its supporting chains extended so as to be attached to a horizontal supporting beam. Fig. 2 is a top edge view, Fig. 3 is a right-hand end view and Fig. 4 is a detail sectional view showing the connection between the handle and suspension bar.

While the preferred embodiment of my invention is fully shown in the accompanying drawings and its construction and operation is clearly described in this specification, the right is reserved to make such changes from the construction shown and described herein as the scope of the claims hereto appended will permit.
In carrying out my invention, I provide a suspension bar provided with flexible means at each end for connection with a support and a handle whereby it may be supported by hand. Pivotally connected by means of a link, below and to said suspension bar is the scale beam, the link preferably secured to the suspension bar by a set-screw rendering the scale-beam detachable when it is desired to use it as an ordinary steel yard. Said scale beam is balanced by means of a small weight or poise slidable on the short arm of said beam, which is graduated in ounces. When a light article is to be weighed in ounces or fractions thereof, the small poise is moved along the beams towards the fulcrum and the weight hook, which is pivoted to the beam between the fulcrum and the small poise. Said small poise is provided with a set-screw whereby it may be secured at any place on the short arm when heavy articles are to be weighed. The long arm of the beam on the other side of the fulcrum carries another poise and the end of said arm is confined in a metallic eye hung from the suspension bar. Said eye is preferably of a diamond or oval shape with restricted top and bottom to keep the beam from rubbing the sides thereof, and may be provided with a hook or support for poises when they are not to be used in weighing.

As the suspension bar is provided with chains and a handle, the scales may be suspended anywhere to a support overhead in any outbuilding where weighing is to be done, or may be supported by hand where the material to be weighed is comparatively light.

My scale is especially adapted for farmers' use and may be taken as a whole to the field, for weighing hay, or the beam may be quickly detached and used as an ordinary steel yard. By suspending a hanging platform 10$^a$ to the weight hook, all the advantages of the platform scale may be had with the additional advantages mentioned above.

Referring more particularly to the drawings, 1 represents the suspension bar to the ends of which are attached the chains 2 carrying hooks 3 at their ends adapted to be caught in any of the links in the chains, making the adjustment easy for leveling the bar. A handle 4 is pivoted through the bar and is adapted to be turned down out of the way when not in use. In large sizes of scales, the handle may be pivoted through, instead of around, said bar. Below the handle, is secured by means of a set screw 5, a link 6 connected at its other end with the scale beam 7 having a short arm 8 and a long arm 9. The weight hook 10 is arranged on the short arm side of the fulcrum connection with the suspension bar. Said short arm is preferably curved slightly upward as at 11, at its end to confine the poise 12 thereon, and is graduated in ounces. Said poise is provided with a set-screw 13 and is adapted to balance the long arm of the beam when it is arranged at the extreme point away from the fulcrum and weight hook. The long arm 9 may be graduated in pounds and carries a poise 14. A pivoted eye-piece 15 hung from the end of the suspension bar confines the end of the long arm and carries a hook 16 for extra poises.

In using my scale the poise on the short arm may be employed merely as a counter-balance for the long arm, for weighing in ounces as light weights or fractions of points where the thing being weighed comes between two even pounds, or it may be used to ascertain the net weight. In the latter case, the poise on the short arm is adjusted to balance the tare by moving it towards the fulcrum when the long arm will indicate the net weight, and adding the net to the tare the gross weight may be found.

Having thus described my invention, what I claim as new and desire to secure by Letters Patent, is:

1. A portable scale comprising a suspension bar having chains connected at each end thereof, each chain carrying a hook on its end adapted to catch in the links of the chains, whereby the bar may be readily adjusted horizontal and a beam pivotally connected below said bar by means of a link detachably secured to said bar, said beam having means for performing the weighing operation.

2. A portable scale comprising a suspension bar having chains connected at each end thereof, each chain carrying a hook on its end adapted to catch in the links of the chains, said bar carrying a handle, and a beam pivotally connected below said bar by means of a link detachably secured to said bar, said beam having means for performing the weighing operation.

3. A portable scale comprising a suspension bar having chains connected at each end thereof, each chain carrying a hook on its end adapted to catch in the links of the chains, said bar carrying a handle adapted to be turned down below said bar, and a beam pivotally connected below said bar by means of a link detachably secured to said bar, said beam having means for performing the weighing operation.

4. In a scale, the combination with a suspension bar having means of connection with a support, a beam pivotally connected below said bar, said beam having means to perform the weighing operation, of an eye-piece formed with its opening wide at the center and restricted at the top and bottom, said eye-piece pivoted to said bar, depending therefrom and confining the end of the beam.

5. A portable scale comprising a beam, a suspension bar parallel to said beam and connected thereto by a link, and a handle connected to said bar above and in line with said link, said handle adapted to be turned down below said bar, said beam having means for performing the weighing operation.

6. In a scale, the combination, with a suspension bar having means of connection with a support, a beam pivotally connected below said bar, said beam having means to perform the weighing operation, of an eye-piece formed with its opening wide at the center and restricted at the top and bottom, said eye-piece pivotally hung from said bar, confining the end of the beam and carrying a poise-hook at its lower end.

In testimony whereof, I affix my signature, in presence of two witnesses.

ELMER GAZLEY.

Witnesses:
MILES MCINTYRE,
F. H. COLVIG.